United States Patent
Posthuma

(10) Patent No.: US 7,676,031 B2
(45) Date of Patent: Mar. 9, 2010

(54) METHOD AND APPARATUS FOR SELECTIVELY TERMINATING CURRENT IN A DIGITAL SUBSCRIBER LINE (DSL) MODEM

(75) Inventor: Carl Robert Posthuma, Wheaton, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1434 days.

(21) Appl. No.: 10/957,297

(22) Filed: Sep. 30, 2004

(65) Prior Publication Data

US 2006/0072606 A1   Apr. 6, 2006

(51) Int. Cl.
  *H04M 11/00*   (2006.01)
  *H04L 12/66*   (2006.01)
(52) U.S. Cl. ............ 379/93.28; 379/90.01; 379/1.01
(58) Field of Classification Search .......... 379/93.28, 379/93.29, 90.01, 93.36, 29.01, 22, 1.01, 379/399.01, 387, 377, 413; 330/252, 255, 330/276, 264; 326/30, 86, 83, 90, 106, 109; 327/111, 112
See application file for complete search history.

(56) References Cited

U.S. PATENT DOCUMENTS

| 6,324,212 | B1 * | 11/2001 | Jenness | ............ 375/222 |
| 6,538,510 | B1 | 3/2003 | Amrany et al. | |
| 6,580,286 | B1 | 6/2003 | Tennen | |
| 6,647,117 | B1 * | 11/2003 | Wallace et al. | ............ 379/413 |
| 6,870,901 | B1 * | 3/2005 | Gudmundsson et al. | ....... 379/22 |
| 7,072,363 | B1 * | 7/2006 | Schier | ............ 370/509 |

FOREIGN PATENT DOCUMENTS

EP   1 111 896 A1   6/2001

OTHER PUBLICATIONS

European Search Report.

* cited by examiner

*Primary Examiner*—Melur Ramakrishnaiah
(74) *Attorney, Agent, or Firm*—Fay Sharpe, LLP

(57) ABSTRACT

A method and apparatus for selectively terminating sealing current in an asymmetric digital subscriber line modem is provided. The technique comprises providing a mechanism (e.g., a resistor or suitable current sink) to a DSL modem (e.g. an ADSL modem or any XDSL modem used where POTS is underlying service). The mechanism is operable to be dynamically switched on and off and to operate under low current conditions. The system allows for provision of DSL (e.g., ADSL or XDSL where POTS is the underlying current) in the absence of plain old telephone service (POTS) and for improved performance.

17 Claims, 5 Drawing Sheets

(a)

(b)

(c)

METHOD AND APPARATUS FOR SELECTIVELY TERMINATING CURRENT IN A DIGITAL SUBSCRIBER LINE (DSL) MODEM

BACKGROUND OF THE INVENTION

This invention relates to a method and apparatus for selectively terminating sealing current in a digital subscriber line (DSL) modem such as an ADSL modem or any XDSL modem used where POTS is the preferred underlying service. More particularly, the present technique comprises providing a mechanism (e.g. a resistor or suitable current sink) to a DSL modem, wherein the mechanism is operable to be dynamically switched between on and off states and to selectively operate under low current conditions. This system allows for provision of DSL (e.g., ADSL or XDSL where POTS is the underlying service) in the absence of plain old telephone service (POTS) and for improved performance.

While the invention is particularly directed to the art of ADSL service, and will be thus described with specific reference thereto, it will be appreciated that the invention may have usefulness in other fields and applications. For example, the invention may be used in other types of remote communication devices requiring termination of current such as in other XDSL services such as SHDSL, VDSL, VDSL2, ADSL 2+.

By way of background, traditional DSL service was designed to operate in conjunction with Plain Old Telephone Service (POTS) devices. As shown in FIG. 1(a), a network 10 includes a core network 12 in communication with a central office 14. Central office 14 is in communication with a customer through customer premises equipment (CPE) 16. Existing copper lines or loops 18 connect the central office (CO) 14 and the CPE 16. It will be understood by those skilled in the art that the lines or loops 18 comprise a twisted pair of lines (e.g., a tip (T) line and a ring (R) line). In the drawings, the split pair is shown where advantageous for explanation but is not shown in every possible location for ease of viewing.

The central office 14 includes a DSL modem 20, as well as a plain old telephone system (POTS) line card 22. Also shown are high pass filter 21 and low pass filter 23, which facilitate the implementation of the DSL service.

The customer premises equipment (CPE) 16 includes a DSL modem 24, a POTS phone 26 and a personal computer 29 (or the like). Also shown are high pass filter 25 and low pass filter 27, which facilitate the implementation of the DSL service.

The underlying POTS service and equipment shown allows for DC current (that also acts as a sealing current) to flow from the POTS line card 22 disposed within the central office (CO) 14, through the copper lines or loops 18, to a POTS phone 26. The POTS phone 26 terminates the current by completing the circuit. This current is typically run through the copper lines 18 for purposes of powering the POTS phone and also cleaning the copper splices in the copper loops 18. It is known that, absent the DC current, a certain percentage of the copper loops 18 would deteriorate and become obstacles to providing POTS or ADSL service of sufficient quality.

Notably, the DSL modem 24 that is a part of the customer premises equipment (CPE) 16 does not include any mechanism for terminating current. There is no need for such an enhancement to the DSL modem 24 in these circumstances because traditional DSL service is implemented in conjunction with POTS service. As noted above, the POTS phone is operable to terminate current.

However, DSL service is now increasingly being demanded in circumstances where no POTS service is available, e.g., in voice-over-Internet-Protocol (VOIP) networks. Without underlying POTS service, there is consequently no manner of terminating the sealing current—which should be advantageously provided to clean the copper loops on the ADSL lines.

While it is understood that problematic loops in such implementations of DSL service currently constitute only a small percentage of DSL subscriber installations, this small percentage nonetheless translates to a high number of modems. As such, this is a situation that demands a practical solution.

To address the problem currently, service providers simply dispatch service personnel in trucks to the customer premises to install a resistor in the network interface device (NID) at the customer premises. The resistor simulates the off hook condition of the POTS phone 26 and provides a mechanism to terminate the sealing current. To illustrate, referring now to FIG. 1(b), the customer premises equipment (CPE) 16 differs from that of FIG. 1(a) in that underlying POTS service is not available. So, a POTS phone 26 is not present at the premises. Also, the configuration of the filters is different. As shown, a resistor 28 is installed between the tip line and ring line of the twisted pair of loop 18 (in, for example, a network interface device (NID) 17). A low pass filter 27 is also provided.

This approach, though, has its drawbacks. For example, it is expensive to dispatch personnel. Moreover, this approach requires the DC current to be dissipated continuously. This wastes power and, therefore, does not allow for reduction of power consumption. In addition, this approach does not allow for any remote control of the installed resistor.

The present invention contemplates a new and improved system and technique that resolves the above-referenced difficulties and others.

SUMMARY OF THE INVENTION

A method and apparatus for selectively terminating current in an asymmetric digital subscriber line (ADSL) modem are provided.

In one aspect of the invention, a system comprises an ADSL modem, a current terminating device housed within the modem and a control module operative to control the current terminating device.

In another aspect of the invention, the current terminating device comprises a resistor.

In another aspect of the invention, the current terminating device comprises a current sink device.

In another aspect of the invention, the control module is operative to control the current terminating device by selectively switching the current terminating device between on and off states.

In another aspect of the invention, the control module is operative to control the current terminating device by selectively switching the current terminating device between on and off states through a message.

In another aspect of the invention, the message is one of an embedded operations channel (EOC) message and an ADSL operations channel (AOC) message.

In another aspect of the invention, the control module is housed within an ADSL element management system.

In another aspect of the invention, a method comprises transmitting a first message to the ADSL modem, the first message including data to activate a current terminating device, activating the current terminating device based on the first message, sending a sealing current to the current terminating device through copper lines, transmitting a second message to the modem, the second message including data to deactivate the terminating device, and deactivating the current terminating device based on the second message.

In another aspect of the invention, the method is implemented using appropriate means.

In another aspect of the invention, a method comprises querying to determine if plain old telephone service (POTS) is available in a customer premises, determining if a current terminating device is available in the modem if the plain old telephone service (POTS) is not available, and controlling the current terminating device if it is available.

An advantage of the presently described embodiments is that such embodiments allow for the provision of ADSL service in circumstances where POTS service is not desired or provided, such as is the case in voice-over-internet-protocol (VOIP) environments.

An advantage of the presently described embodiments is that such implementations reduce cost to the service provider, inasmuch as they do not require the dispatch of personnel and equipment, as described above.

Another advantage of the presently described embodiments is that less power is consumed in the central office.

Another advantage of the presently described embodiments is that less power is consumed by the customer premises equipment (CPE).

Another advantage of the presently described embodiments is that less power is consumed overall by virtue of controlling the time that power may be dissipated.

Another advantage of the presently described embodiments is that the sealing current mechanism is remotely controllable.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination of the various parts of the device, and steps of the method, whereby the objects contemplated are attained as hereinafter more fully set forth, specifically pointed out in the claims, and illustrated in the accompanying drawings in which:

DETAILED DESCRIPTION OF THE PREFERRED EMBODIMENTS

Figure 1A:
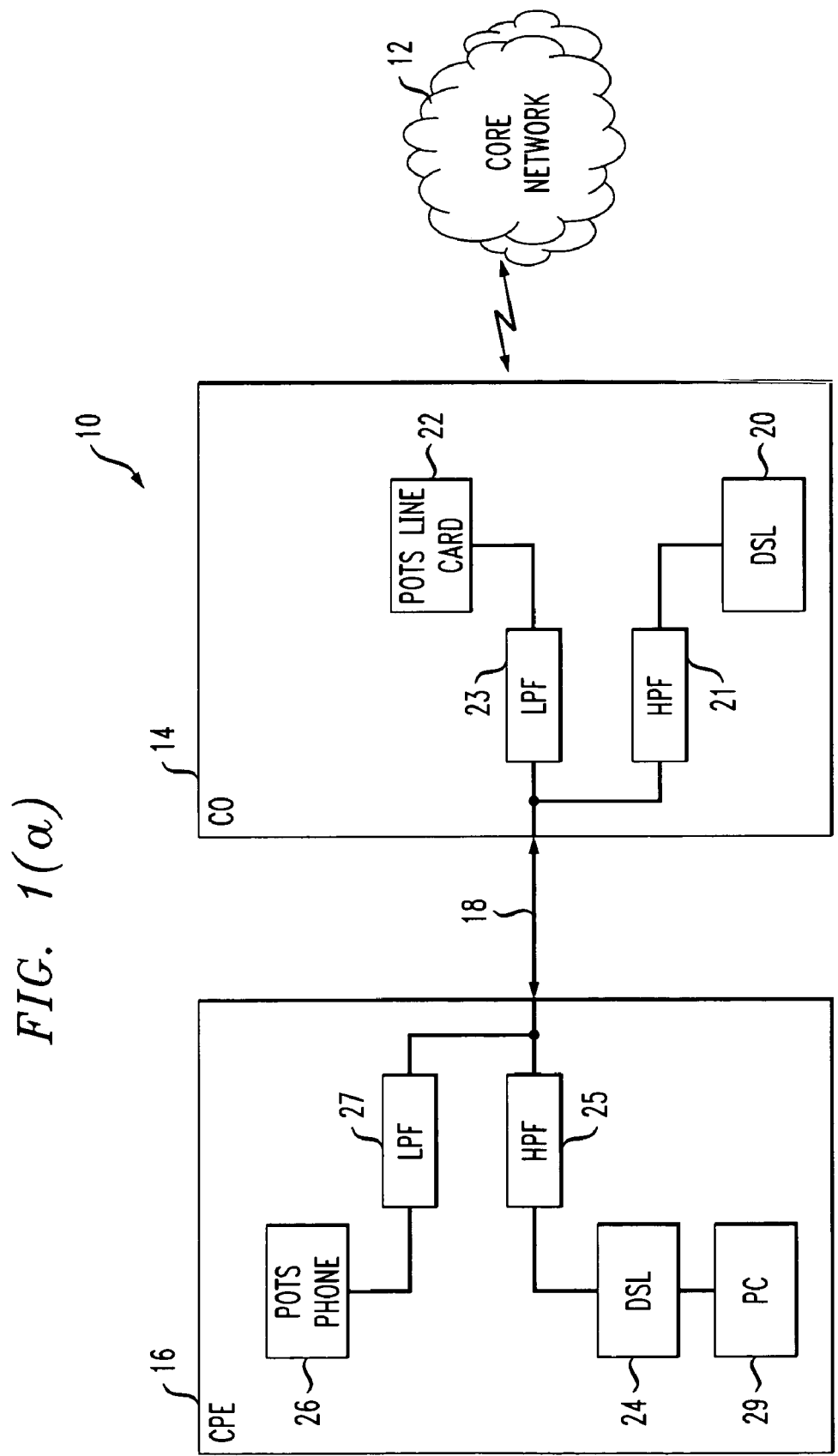
FIGS. 1(a) and 1(b) are graphic illustrations of prior art networks.
Figure 1B:
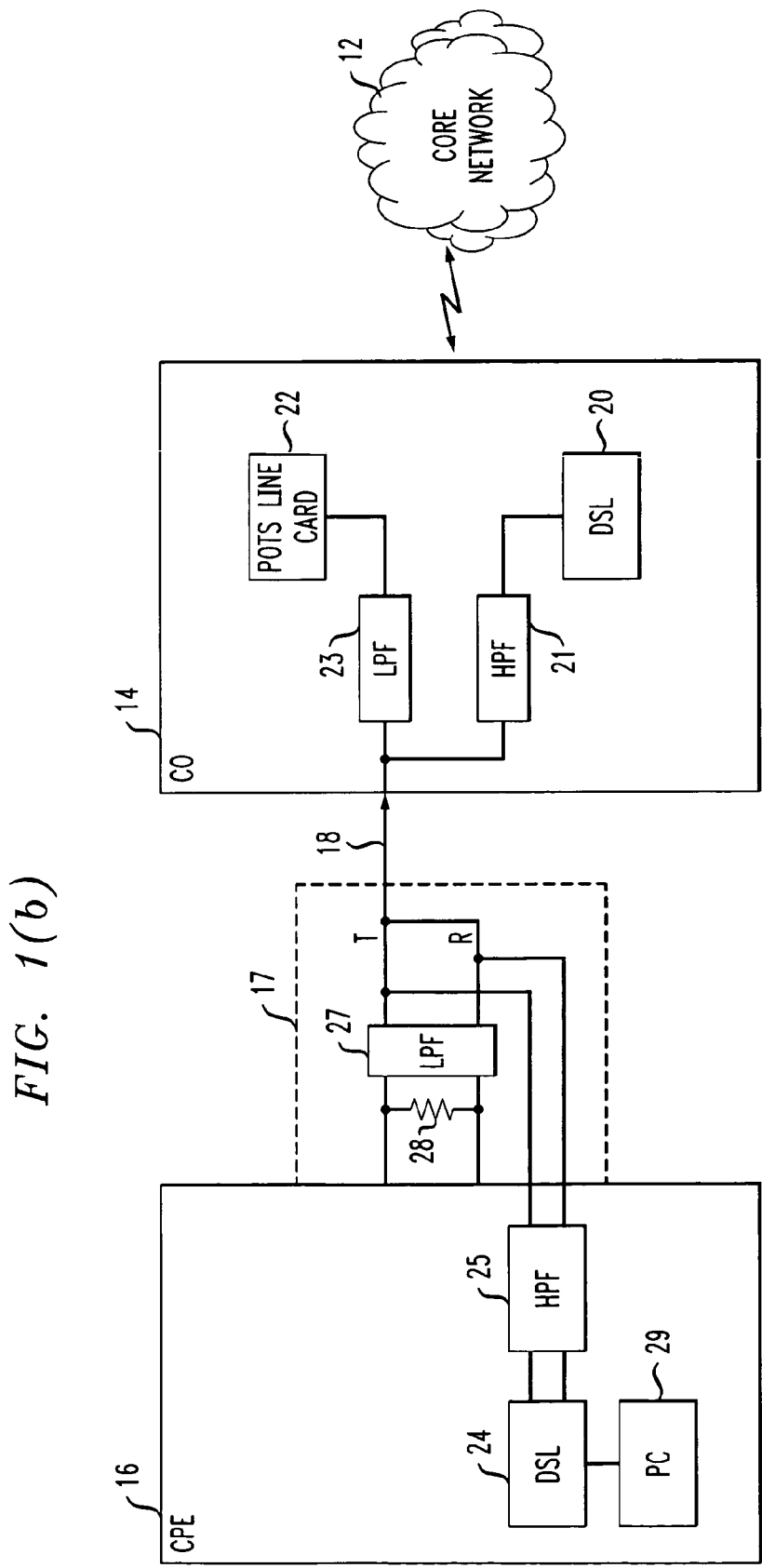
Figure 2:
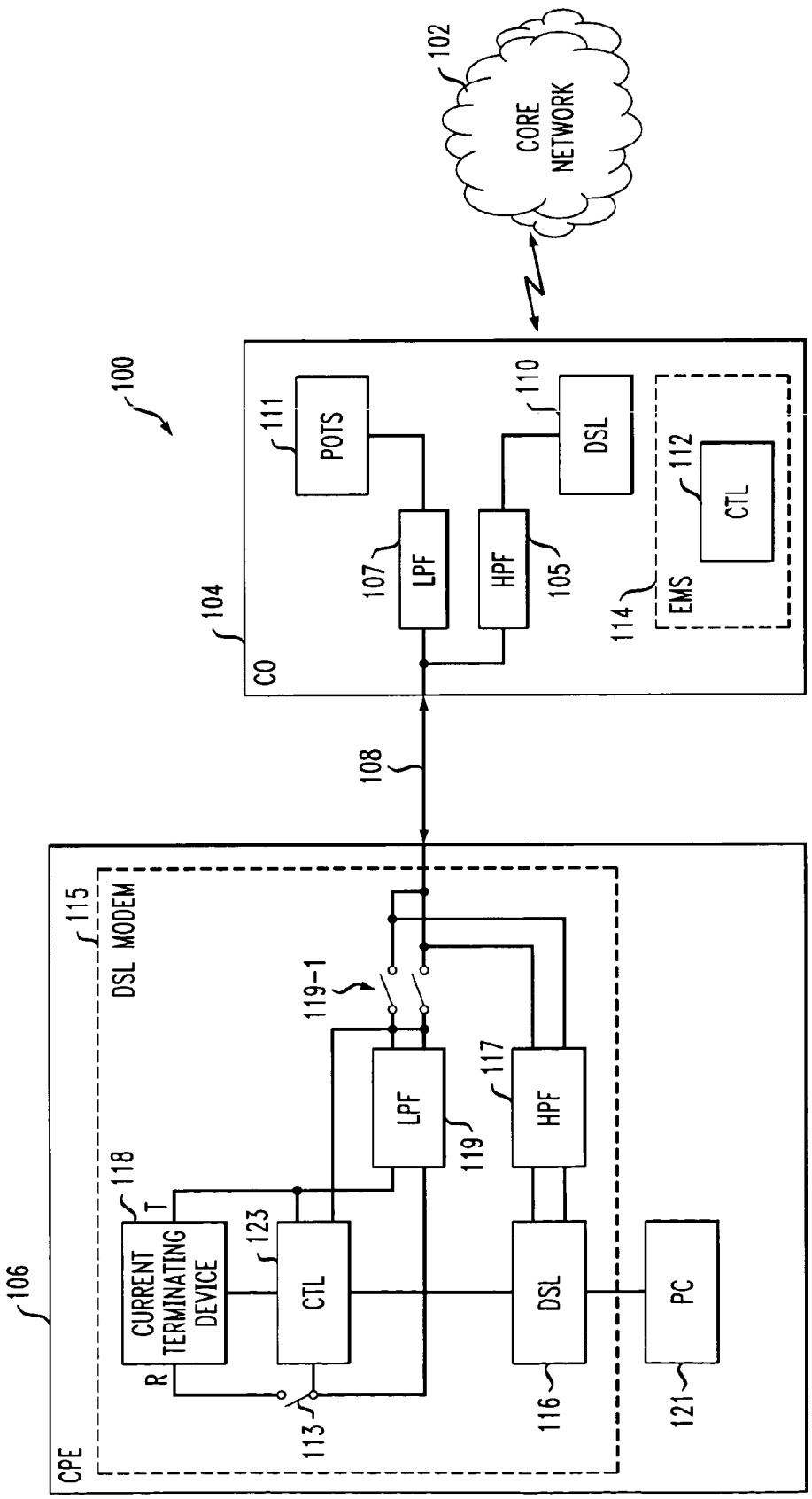
FIG. 2 is a graphic illustration of a network incorporating an embodiment of the present invention.

Referring now to the drawings wherein the showings are for purposes of illustrating the preferred embodiments of the invention only and not for purposes of limiting same, FIG. 2 provides a view of an exemplary network into which the present invention may be incorporated. As shown, a network 100 includes a core network 102 in communication with a central office (CO) 104. The central office (CO) 104 is connected to a customer through customer premises equipment (CPE) 106. Copper lines or loops 108 typically connect the central office (CO) 104 with the customer premises equipment (CPE) 106. The copper lines or loops 108 are typically comprised of copper line pairs that connect directly to the customer premises equipment (CPE) 106. As noted above, it will be understood by those skilled in the art that the lines or loops 108 comprise a twisted pair of lines (e.g., a tip (T) line and a ring (R) line). In the drawings, the split pair is shown where advantageous for explanation but is not shown in every possible location for ease of viewing. For example, the split pair is shown within the customer premises equipment (CPE) 106 but is only represented as a single line in the central office (CO) 104 and between the customer premises equipment (CPE) 106 and the central office (CO) 104.

The central office (CO) 104 includes a DSL modem 110 and a control module 112 that, in at least some embodiments, may be disposed within an element management system (EMS) 114. Also shown are a high pass filter 105 and a low pass filter 107, which facilitate the implementation of the DSL service. The high pass filter 105 and the low pass filter 107 connect to the line 108 as those of skill in the art will appreciate.

The customer premises equipment (CPE) 106 includes a DSL modem 115 (shown in dashed lines) having a DSL module 116 and a current terminating device 118 disposed therein. The current terminating device 118 may also have a switch 113 to conveniently allow for activation or deactivation of the current terminating device. As will be described below, this switch could be opened or closed in response to control data or messages to dynamically control the device 118. This will also provide the service provider with the option of providing the same modem to all customers, whether or not those customers require the use of the current terminating device. Of course, different types of modems could also be provided depending on whether a customer requires the current terminating device. The customer premises equipment (CPE) 106 also includes a high pass filter 117, a low pass filter 119 (having associated therewith switches 119-1 that are closed in response to control module 112 when the current terminating device is to be used) and a personal computer 121 or other internet connecting device.

As shown, the copper wire lines or loops 108 connect to the DSL modem 115. The lines 108 connect to the DSL module 116 through the high pass filter 117 and to the current terminating device 118 through the low pass filter 119. In addition, the lines 108 connect (through the low pass filter 119) to the current terminating device 118 by having the tip (T) line connect to one side or port of the current terminating device 118 and the ring (R) line connect to another side or port of the current terminating device 118. The high pass filter 117 and the low pass filter 119 may be a part of the DSL modem 115 as shown or may be disposed outside the modem. The precise configuration will vary based on the objectives of the design implemented. For example, if the filters were both external to the modem, more than one connection of lines 108 to the DSL modem 115 may be required. As a further example, if a DC current sink is used as the current terminating device, then a low pass filter may not be necessary because such a DC current sink would not disturb the DSL signal. As a still further example, the functionality of switches 113 and 119-1 may be incorporated into a single device, depending on the components used.

Also shown is a controller 123 that will read the control data or messages that are sent to the DSL modem and act accordingly to, for example, activate or deactivate the current terminating device 118. For example, the controller 123 may read a bit in the control message and send a signal to the device 118 and/or switches 113 and/or 119-1 to open or close one or more of these switches, e.g. switches 113 and/or 119-1, or otherwise activate/deactivate the device. However, the precise technique for accomplishing these techniques will vary and will depend on the form of the current terminating device.

Figure 3:
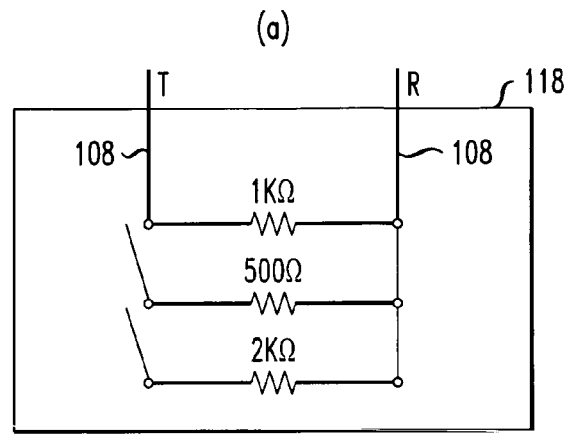
FIGS. 3(a), 3(b), and 3(c) are graphic illustrations of selected elements of the network of FIG. 2.
Figure 3:
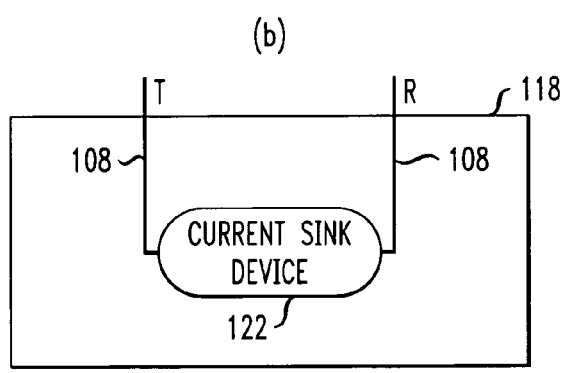
Figure 3:
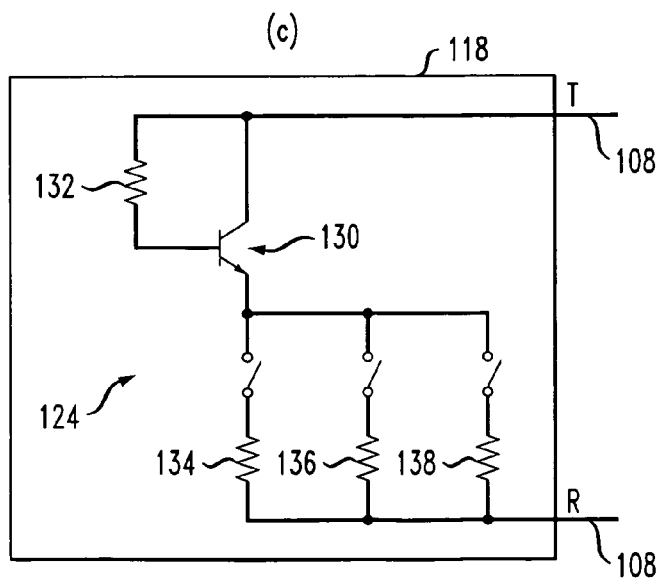

Referring now to FIGS. 3(a), 3(b) and 3(c), it should be appreciated that the current terminating device 118 may take a variety of forms. For example, as shown in FIG. 3(a), the current terminating device 118 may take the form of a resistor or a resistor network 120 connected at each end to the lines or loops 108. As shown, the network of resistors includes resistors of varying values (e.g. 500 ohms, 1 kilo-ohm, 2 kilo-ohms, etc.) to allow for variation in the desired overall impedance of the device. To facilitate the contemplated variation, a series of switches is illustrated. These switches may be activated through software controls or may be manually set or reset by a technician. Of course, other switching techniques may be used. Likewise, other suitable impedance changing techniques may be implemented. In addition, a single resistor may be used.

Alternatively, the current terminating device 118 may simply take the form of a current sink device 122, as shown in FIG. 3(b), connected to the lines 108. Current sink devices can take a variety of forms that would be suitable here. For example, a DC current sink device is preferred in some situations. As noted above, in this case, a low pass filter may not be required.

For example, with reference to FIG. 3(c), a current sink device 124 may comprise a transistor 130, a first resistor 132, a second resistor 134, a third resistor 136, and a fourth resistor 138. The values for each of these components will vary depending on the implementation. Also shown are a series of switches associated with each of the resistors 134, 136, and 138. This network of resistors and switches allows for variance in the overall impedance of the device and thus the resulting current flow. As with the embodiment shown in FIG. 3(a), the switches can be selectively activated in any of a number of manners. For example, the switching may be implemented through software control or it may be manually implemented. In addition, as illustrated, the tip (T) line of line 108 connects to the transistor 130 while the ring (R) line of line 108 connects to the resistor network 134, 136, and 138.

In one form of the invention, the current sink limit on the current terminating device 118 may be limited to five milliamps (mA) or some other number of mA instead of the 50 mA or higher that is currently used in POTS phones. This will allow for a reduction in required power and, thus, improved overall performance.

Notably, the addition of the current terminating device 118 within the DSL modem 115 will also allow the DSL modem 115 to complete the circuit that is required to effectively terminate a sealing current from the central office (e.g., the central office POTS line card 111 or other source), to the customer premises equipment (CPE) 106. As noted above, the addition of this current terminating device 118 will allow for proper cleaning of the splices in the copper lines or loops 108 to ensure improved life span of the copper lines or loops 108.

In addition, the implementation of the control module 112 in the architecture of the central office (CO) 104 allows for dynamic switching control of the current terminating device 118. This dynamic control of the current terminating device 118 results in improved performance and consumption of less power.

More particularly, use of the current terminating device 118, and the system contemplated herein including the control module 112, requires provisioning of the connection, upon initialization, between the central office (CO) 104 and the DSL modem 115. It will be understood that when the DSL modem 115 is installed as a part of the customer premises equipment (CPE) 106, an initialization routine is conducted. There are a variety of known routines that will allow the DSL modem 115 to communicate with the DSL modem 110 in the central office (CO) 104. These routines use a G.hs handshake protocol, which is likewise known. The methods according to the present invention use a G.hs handshake protocol; however, the initialization of the current terminating device, if available and usable, is also accomplished. It should be understood that other initialization functions may be accomplished, but these will not be described for ease of explanation.

Figure 4:
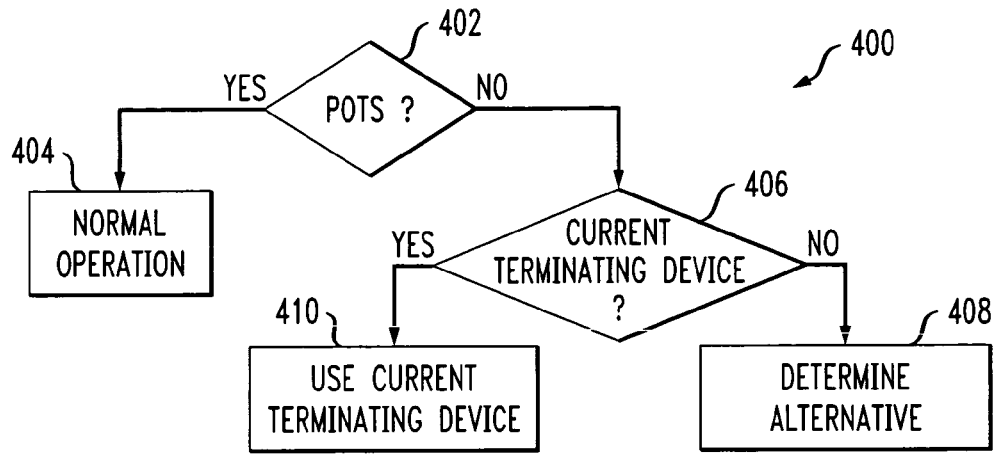
FIG. 4 is a flow chart illustrating a method according to the present invention and, FIG. 5 is a flow chart illustrating a method according to the present invention.

With reference to FIG. 4, during the initialization process, a method 400 is implemented wherein the control module 112 queries appropriate storage tables and/or databases (such as databases storing customer subscription data) that are present in the network to determine if POTS service is available within the customer premises equipment (CPE) 106 (at 402). If so, normal processing and further conventional initialization is conducted (at 404). If POTS service is not available, the control module 112 determines if a current terminating device, such as current terminating device 118, is available in, for example, the DSL modem (at 406). This information is stored on the modem itself. For example, the status of the switch 113 or switches 119-1 may be stored. In addition, information on the availability of a modem having this capability may be stored on the network. If no current terminating device is available, then the control module 112 triggers the initiation of other procedures to provide DSL service to this site (at 408). For example, the control module 112 may issue a service ticket to prompt customer service personnel to dispatch technicians and a truck to the customer premises to install a resistor in the network interface device (NID), as has been done in the past.

If, however, a current terminating device is available for use, then a notation is made by the control module 112 (e.g. set flag, . . . etc.) to initiate control procedures for the current terminating device at appropriate times (at 410). These control procedures and parameters which are implemented and maintained by the control module 112 are described in more detail below.

As an option, and depending upon the intelligence capability of the DSL modem, a further step of configuration may take place. For example, the control module 112 may download parameters of operation to the DSL modem 115 (e.g. DSL module 116) relating to the current terminating device. The downloaded parameters may be set by the control module 112 or may be input thereto by a technician. These parameters may inform the DSL modem of the times and circumstances in which the DSL modem should activate the current terminating device to provide the sealing current.

In any event, the parameters set for controlling the current terminating device, whether applied by the control module 112 or the DSL modem 115 or any other control means, may vary widely depending on the objectives of the user setting the parameters. These parameters will typically define the frequency and time periods of activation of the current terminating device. These parameters may be pre-defined and set for particular installations depending on the equipment used, objectives of the technician, etc.

For example, the parameters may indicate that the current terminating device simply be kept on at all times. Of course, while this consumes more power than other methods, it nonetheless makes use of a low power current terminating device (unlike prior known methods). Another approach may be to simply activate the current terminating device when a connection is made. This may occur when a user attempts to access the internet through a personal computer. As a further example, the current terminating device 118 may be activated, based on predetermined time periods and frequencies, for one hour per day or one hour per week or the like. The current terminating device 118 may also be controlled to pulse or quickly switch between on and off states so that less heat dissipation results.

In operation, a variety of methods could be implemented to dynamically control the current terminating device 118 through the control module 112. The current terminating device could be dynamically controlled, based on the parameters set as above, through use of embedded operations channel (EOC) messages or an ADSL operations channel (AOC) messages. Of course, other suitable messages may also be used.

In any event, these messages preferably include data to dynamically turn the current terminating device 118 from an on state to an off state to allow the modem to selectively be activated. The control module 112 and current terminating device 118 can be used advantageously to provide DSL service where POTS service is not available and also provide for improved overall performance.

Typically, the methods will be implemented in software routines that control the hardware as desired. These methods also provide for the generation of appropriate messages, such as the EOC messages or the AOC messages noted above. These software routines may be implemented in a variety of single locations, or may be distributed in various elements of the network, but—in at least one form of the invention—the routines are stored in and run by the control module 112.

The control module 112 and its described functionality of initializing the DSL modem, using the G.hs handshake protocol, and/or controlling the current terminating device of the DSL modem, using EOC or AOC messages, are controlled and monitored by the element management system (EMS) 114, in at least one form of the invention. In alternative embodiments, a DSLAM module may be used for such control and monitoring.

The actual operation of the system contemplated herein will vary from application to application once the system is initialized, as noted above. However, at least one of these processes includes the transfer of messages between the control module 112 and the DSL modem 115 to control the current terminating device 118 of the DSL modem 115. This is based on the procedures and parameters noted above. As will be seen, this particular approach involves control of the current terminating device by the network (e.g. the control module 112).

Figure 5:
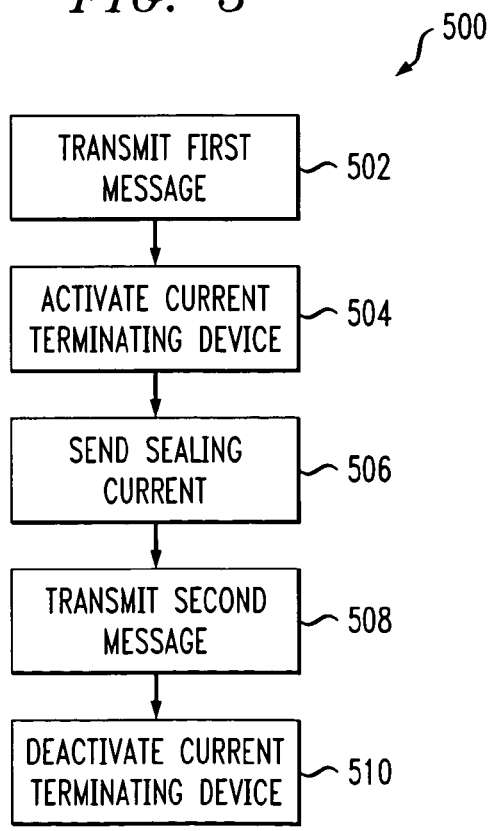

In this regard, referring now to FIG. 5, an exemplary method 500 includes transmitting a first message to an ADSL modem (e.g. modem 116) (at 502). It should be appreciated that this first message includes data to activate the current terminating device. Next, the current terminating device is activated based on the first message (at 504). A sealing current then flows through the current terminating device through the copper lines (e.g. lines 108) (at 506). This, of course, provides for appropriate cleaning of the copper lines to avoid problems noted above.

When it is determined that the transmission of sealing current should cease, a second message is transmitted to the modem (at 508). The second message, of course, includes data to deactivate the terminating device. The current terminating device is then deactivated (at 510).

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

I claim:

1. A system for use in providing digital subscriber line (DSL) service, the system comprising:
   a DSL modem;
   a current terminating device housed within the modem; and,
   a control module operative to control the current terminating device by transmitting a first message to the DSL modem to activate the current terminating device, wherein the control module is further operative to control the current terminating device by transmitting a second message to the DSL modem to deactivate the current terminating device.

2. The system as set forth in claim 1 wherein the current terminating device comprises a resistor.

3. The system as set forth in claim 1 wherein the current terminating device comprises a current sink device.

4. The system as set forth in claim 1 wherein the control module is operative to control the current terminating device by selectively switching the current terminating device between on and off states.

5. The system as set forth in claim 1 wherein the control module is operative to control the current terminating device by selectively switching the current terminating device between on and off states through the first and second messages.

6. The system as set forth in claim 5 wherein the message is one of an embedded operations channel (EOC) message and an ADSL operations channel (AOC) message.

7. The system as set forth in claim 1 wherein the control module is within a DSL element management system (EMS).

8. A method comprising:
   transmitting a first message to a DSL modem, the first message including data to activate a current terminating device;
   activating the current terminating device based on the first message;
   sending a sealing current to the current terminating device through copper lines;
   transmitting a second message to the DSL modem , the second message including data to deactivate the terminating device; and,
   deactivating the current terminating device based on the second message.

9. An apparatus comprising:
   means for transmitting a first message to a DSL modem, the first message including data to activate a current terminating device;
   means for activating the current terminating device based on the first message;
   means for sending a sealing current to the current terminating device through copper lines;
   means for transmitting a second message to the current terminating device, the second message including data to deactivate the terminating device; and, means for deactivating the current terminating device based on the second message.

10. A method comprising:

querying to determine if plain old telephone service (POTS) is available in a customer premises;

determining if a current terminating device is available in a digital subscriber line (DSL) modem associated with the premises if the plain old telephone service (POTS) is not available; and controlling the current terminating device if it is available.

11. The method as set forth in claim 10 wherein the controlling comprises selectively switching the current terminating device between on and off states.

12. The method as set forth in claim 10 wherein the controlling comprises selectively switching the current terminating device between on and off states using messages.

13. The method as set forth in claim 12 wherein the messages are one of embedded operations channel (EOC) messages and an ADSL operations channel (AOC) messages.

14. The method as set forth in claim 10 wherein the controlling comprises:

transmitting a first message to the DSL modem, the first message including data to activate the current terminating device;

activating the current terminating device based on the first message;

sending a sealing current to the current terminating device through copper lines;

transmitting a second message to the current terminating device, the second message including data to deactivate the terminating device; and, deactivating the current terminating device based on the second message.

15. The method as set forth in claim 10 wherein the controlling is accomplished by a control module within a central office system.

16. The method as set forth in claim 10 wherein the querying includes querying a database.

17. The method as set forth in claim 11 wherein the selective switching is based on predetermined time periods and frequencies.

* * * * *